US 8,351,862 B2

(12) United States Patent
Tsui et al.

(10) Patent No.: US 8,351,862 B2
(45) Date of Patent: Jan. 8, 2013

(54) DEVICE, SYSTEM, AND METHOD OF MITIGATING INTERFERENCE TO DIGITAL TELEVISION SIGNALS

(75) Inventors: Ernest T. Tsui, Cupertino, CA (US); Nick Cowley, Wiltshire (GB); Bernard Arambepola, Enfield (GB)

(73) Assignee: Intel Corporation, Santa Clara, CA (US)

(*) Notice: Subject to any disclaimer, the term of this patent is extended or adjusted under 35 U.S.C. 154(b) by 1409 days.

(21) Appl. No.: 11/968,168

(22) Filed: Jan. 1, 2008

(65) Prior Publication Data

US 2009/0167945 A1 Jul. 2, 2009

(51) Int. Cl.
*H04B 1/00* (2006.01)

(52) U.S. Cl. ......... 455/63.1; 455/73; 455/403; 348/552; 348/729

(58) Field of Classification Search .................. 455/63.1; 348/552
See application file for complete search history.

(56) References Cited

U.S. PATENT DOCUMENTS

| | | | | |
|---|---|---|---|---|
| 5,287,556 | A * | 2/1994 | Cahill | 455/266 |
| 6,072,994 | A * | 6/2000 | Phillips et al. | 455/84 |
| 6,252,633 | B1 * | 6/2001 | Ruitenburg | 348/725 |
| 2007/0184804 | A1 * | 8/2007 | Robert et al. | 455/296 |
| 2008/0129569 | A1 * | 6/2008 | Muhammad et al. | 341/155 |
| 2008/0160920 | A1 | 7/2008 | Tsui et al. | |
| 2009/0133091 | A1 * | 5/2009 | Rofougaran | 725/133 |

* cited by examiner

*Primary Examiner* — Lana N Le
*Assistant Examiner* — Hsin-Chun Liao
(74) *Attorney, Agent, or Firm* — Shichrur & Co.

(57) ABSTRACT

Device, system, and method of mitigating interference to digital television signals. For example, an apparatus includes a diversity-based digital television receiver having a filter controller and at least first and second channel paths, wherein the first channel path includes a first Global System for Mobile communication (GSM) reject filter, the second channel path includes a second GSM reject filter, the second channel path is parallel to the first channel path, and the filter controller is to selectively switch an operational state of the first GSM reject filter.

12 Claims, 3 Drawing Sheets

DEVICE, SYSTEM, AND METHOD OF MITIGATING INTERFERENCE TO DIGITAL TELEVISION SIGNALS

BACKGROUND

A computer may include a digital television receiver, as well as one or more wireless communication transceivers, for example, a wireless transceiver able to operate in accordance with the IEEE 802.11 standard, a wireless transceiver able to operate in accordance with the IEEE 802.16 standard, and/or a Global System for Mobile communication (GSM) transceiver. The operation of the wireless transceivers, and particularly of the GSM transceiver, may interfere with the operation of the digital television receiver. The interference may result in degradation of the quality of the received television signal (e.g., of one or more selected Digital Terrestrial Television (DTTV) channels), for example, due to receiver desensitizing, non-linear clipping, inter-modulation, and other interference effects.

In order to mitigate the interference to the digital television signal, the computer may include and utilize one or more filters, for example, a GSM reject filter. Unfortunately, the GSM reject filter may introduce significant insertion loss across the passband associated with the digital television signal, thereby degrading the operating sensitivity of the digital television receiver.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
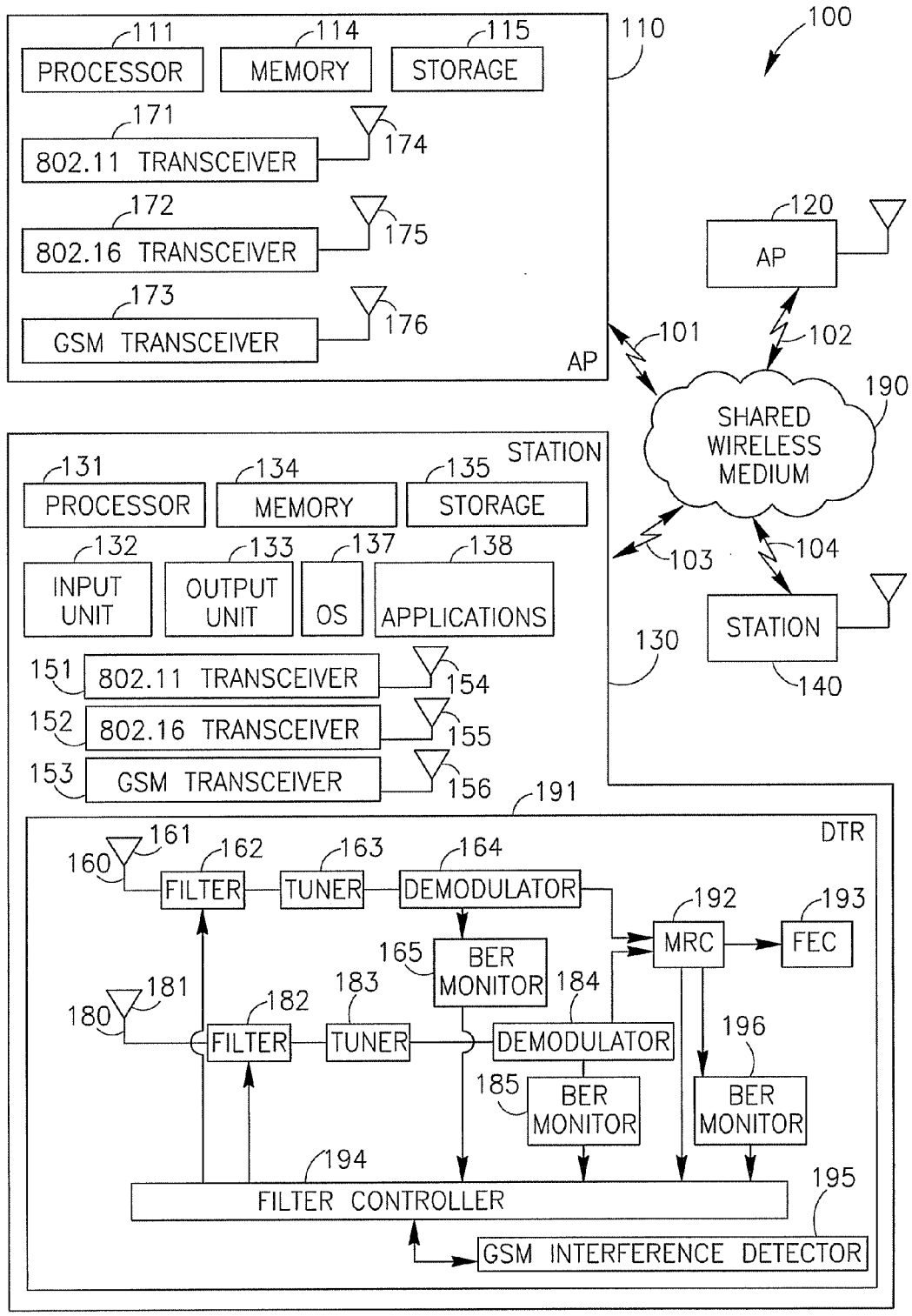
FIG. 1 is a schematic block diagram illustration of a wireless communication system in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2 G, 2.5 G, 3 G, 3.5 G, or the like. Embodiments of the invention may be used in various other devices, systems and/or networks.

The terms "interference" or "noise" as used herein include, for example, random or non-random disturbances, patterned or non-patterned disturbances, unwanted signal characteristics, Inter Symbol Interference (ISI), electric noise, electric interference, white noise, non-white noise, signal distortions, shot noise, thermal noise, flicker noise, "pink" noise, burst noise, avalanche noise, noise or interference produced by components internal to a device attempting to receive a signal, noise or interference produced by co-existing components of a device attempting to receive a signal, noise or interference produced by components or units external to a device attempting to receive a signal, random noise, pseudo-random noise, non-random noise, patterned or non-patterned interference, or the like.

The term "mitigation" (e.g., of interference or noise) as used herein includes, for example, reduction, decrease, lessening, elimination, removal and/or avoidance.

The terms "television signal(s)" or "digital television signals" as used herein include, for example, signals carrying television information, signals carrying audio/video information, Digital Television (DTV) signals, digital broadcast signals, Digital Terrestrial Television (DTTV) signals, signals in accordance with one or more Advanced Television Systems Committee (ATSC) standards, Vestigial SideBand (VSB) digital television signals (e.g., 8-VSB signals), Coded OFDM (COFDM) television signals, Digital Video Broadcasting-Terrestrial (DVB-T) signals, DVB-T2 signals, Integrated Services Digital Broadcasting (ISDB) signals, digital television signals carrying MPEG-2 audio/video, digital television signals carrying MPEG-4 audio/video or H.264 audio/video or MPEG-4 part 10 audio/video or MPEG-4 Advanced Video Coding (AVC) audio/video, Digital Multimedia Broadcasting (DMB) signals, DMB-Handheld (DMB-H) signals, High Definition Television (HDTV) signals, progressive scan digital television signals (e.g., 720p), interlaced digital televisions signals (e.g., 10180i), television signals transferred or received through a satellite or a dish, television signals transferred or received through the atmosphere or through cables, signals that include (in whole or in part) non-television data (e.g., radio and/or data services) in addition to or instead of digital television data, or the like.

Although portions of the discussion herein may relate, for demonstrative purposes, to mitigation of GPS interference, some embodiments of the invention may be used for mitigation of other types of interference or noise.

Although portions of the discussion herein may relate, for demonstrative purposes, to mitigation of interference in a context of a digital television signal and/or a digital television receiver, some embodiments of the invention may be used in conjunction with other types of signals and/or receivers.

Although portions of the discussion herein may relate, for demonstrative purposes, to mitigation of interference to digital television signals in a context of a computing station, some embodiments of the invention may be used in conjunction with other types of devices, for example, a television, a digital television, a monitor or screen, a set-top box, a cable-box, a satellite receiver, a converter, a Video Cassette Recorder (VCR), an entertainment unit, or the like.

The terms "operational state" or "operational status" or "operational mode" as used herein (for example, in association with a filter, with a GSM reject filter, or with other component) include, for example, a state of being active, activated, enabled, operational, or "turned on"; or a state of being inactive, disabled, deactivated, non-operational, or "turned off".

The terms "to switch an operational state" or "to modify an operational state" as used herein (for example, in association with a filter, with a GSM reject filter, or with other component) include, for example, switching a component from a first operational state to a second, different, operational state; switching a component from being activated to being deactivated; switching a component from being deactivated to being deactivated; switching a component from being operational to being non-operational; switching a component from being non-operational to being operational; switching a component from being turned-on to being turned-off; or switching a component from being turned-off to being turned-on.

FIG. 1 schematically illustrates a block diagram of a wireless communication system 100 in accordance with some demonstrative embodiments of the invention. System 100 may include one or more wireless communication stations, for example, wireless communication stations 130 and 140, as well as one or more wireless Access Points (APs), for example, APs 110 and 120. The components of system 100 may communicate using a shared wireless medium 190, for example, using wireless links 101-104.

Station 130 and/or station 140 may be or may include, for example, a computing station, a computing device, a computer, a Personal Computer (PC), a server computer, a client/server system, a mobile computer, a portable computer, a laptop computer, a notebook computer, a tablet computer, a mobile phone, a cellular phone, a handheld device, a network of multiple inter-connected devices, or the like.

Station 130 may include, for example, a processor 131, an input unit 132, an output unit 133, a memory unit 134, and a storage unit 135. Station 130 may optionally include other suitable hardware components and/or software components.

Processor 131 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 131 executes instructions, for example, of an Operating System (OS) 137 of station 130 or of one or more applications 138.

Input unit 132 includes, for example, a keyboard, a keypad, a mouse, a touch-pad, a track-ball, a stylus, a microphone, or other suitable pointing device or input device. Output unit 133 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 134 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 135 includes, for example, a hard disk drive, a floppy disk drive, a Compact Disk (CD) drive, a CD-ROM drive, a Digital Versatile Disk (DVD) drive, or other suitable removable or non-removable storage units. Memory unit 134 and/or storage unit 135, for example, store data processed by station 130.

Station 130 further includes one or more transceivers, for example, a wireless transceiver 151 able to operate in accordance with the IEEE 802.11 standard; a wireless transceiver 152 able to operate in accordance with the IEEE 802.16 standard; and a Global System for Mobile communication (GSM) transceiver 153. Optionally, transceivers 151-153 may be co-located, for example, using a common housing, packaging, card, circuit, modem unit, wireless Network Interface Card (NIC), or communication unit. Optionally, transceivers 151-153 may be implemented using a dual-transceiver card or circuit or unit; may be implemented using a multiple-transceiver card or circuit or unit; or may be implemented using multiple (e.g., substantially separate) cards or circuits or units.

Each of transceivers 151-153 includes a transmitter and/or a receiver, a transmitter-receiver, or other circuitry or sub-units able to transmit and/or receive wireless signals, Radio Frequency (RF) signals, blocks, frames, transmission streams, packets, messages and/or data, e.g., through one or more antennas 154-156. For example, antennas 154, 155 and/or 156 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data. Optionally, antennas 154-156 may be implemented using a common antenna, a common set of multiple antennas, or other suitable component(s).

In some embodiments, some or all of the components of station 130 may be enclosed in a common housing or packaging, and may be interconnected or operably associated using one or more wired or wireless links. In other embodiments, components of station 130 may be distributed among multiple or separate sub-units, devices or locations.

AP 110 and/or AP 120 may be or may include, for example, a wireless AP, a wireless Base Station (BS), a wireless controller, a wireless router, a component of an ad-hoc network operating as an AP or a router, an AP of a Basic Service Set (BSS), a device operating as AP in an Independent BSS (IBSS), an AP or a device able to connect among multiple wireless communication devices, a device able to form a wireless communication network, a device able to relay among wireless communication devices, or the like.

AP 110 may include, for example, a processor 111, a memory unit 114, and a storage unit 115. AP 110 further includes one or more transceivers, for example, a wireless transceiver 171 able to operate in accordance with the IEEE 802.11 standard; a wireless transceiver 172 able to operate in accordance with the IEEE 802.16 standard; and a Global System for Mobile communication (GSM) transceiver 173. Transceivers 171-173 may be associated with one or more antennas, for example, antennas 174-176.

Station 140 may include components similar, in properties and/or in functionality, to the components of station 130. AP 120 may include components similar, in properties and/or in functionality, to the components of AP 110.

Station 130 further includes a Digital Television Receiver (DTR) 191, optionally associated with one or more internal and/or external antennas. The DTR 191 is able to receive, decode and/or process digital television signals. For example, DTR 191 may include, or may be associated with, one or more filters, digital tuners, signal detectors, channel estimators, channel equalizers, demodulators, Forward Error Correction (FEC) units, a digital audio/video decoders, image enhancement units, and/or other suitable components.

In some embodiments, DTR 191 is diversity-based and includes multiple receiver paths, for example, two receiver paths 160 and 180. The first receiver path 160 includes an antenna 161, a filter 162, a tuner 163, and a demodulator 164. The second receiver path 180 includes an antenna 181, a filter 182, a tuner 183, and a demodulator 184. The two receiver paths 160 and 180 are able to receive and demodulate the same channel from the different antennas 161 and 181. Optionally, antennas 161 and 181 are spatially separated, and may be aligned in different polarizations.

The demodulated signal of the first receiver path 160 and the demodulated signal of the second receiver path 180 are combined using a Maximum-Ratio Combining (MRC) unit 192 or ratio-squared combining unit, or other suitable type of combiner or canceller. In some embodiments, the MRC unit 192 adds together the signals from the receiver paths 160 and 180; the gain of each of the added paths is, for example, proportional to Root Mean Square (RMS) signal level and inversely proportional to the mean square noise level of that path (optionally utilizing different proportionality parameters for each path 160 or 180). The resulting MRC-combined sum of the two receiver paths 160 and 180 may have an improved Carrier to Noise Ratio (CNR) in comparison with each of the individual paths 160 and 180. The combined sum is then transferred to a Forward Error Correction (FEC) unit 193.

In path 160, filter 162 may include a GSM reject filter able to reject GSM signals or GSM interference. Optionally, path 160 may include other suitable filters, for example, a filter able to reject IEEE 802.11 signals or IEEE 802.11 interference, and/or a filter able to reject IEEE 802.16 signals or IEEE 802.16 interference.

Similarly, in path 180, filter 182 may include a GSM reject filter able to reject GSM signals or GSM interference. Optionally, path 180 may include other suitable filters, for example, a filter able to reject IEEE 802.11 signals or IEEE 802.11 interference, and/or a filter able to reject IEEE 802.16 signals or IEEE 802.16 interference.

In some embodiments, DTR 191 may selectively activate and/or de-activate, or may selectively enable and/or disable, one or more of filters 162 and 182. In some embodiments, DTR 191 may adaptively and/or dynamically modify the operational status of filter 162 and/or filter 182. This may be performed, for example, by a filter controller 194.

For example, the filter controller 194 may determine that substantially no GSM interference exists, or that GSM interference substantially does not exist. Accordingly, the filter controller 194 disables or deactivates the GSM reject filter 162 of path 160, and further disables or deactivates the GSM reject filter 182 of path 180.

Alternatively or subsequently, the filter controller 194 may determine that GSM interference exists, and that both GSM reject filters 162 and 182 are disabled or deactivated. Accordingly, the filter controller 194 selectively enables or activates the GSM reject filter 162 of path 160, but maintains the GSM reject filter 182 of path 180 disabled or deactivated.

Alternatively or subsequently, filter controller 194 may determine that GSM interference still exists, although GSM reject filter 162 is enabled or activated, whereas GSM reject filter 182 is disabled or deactivated. Accordingly, the filter controller 194 maintains the GSM reject filter 162 enabled or activated, and further enables or activates the GSM reject filter 182.

The filter controller 194 may determine that GSM interference exists, for example, based on a signal received from a GSM interference detector 195. For example, the GSM interference detector 195 may determine that GSM interference exists, based on activation or operation of the local (e.g., co-located or co-existing) GSM transceiver 153; based on detection or estimation that a remote GSM transceiver (e.g., GSM transceiver 173 of AP 110) is activated or operational; or based on other active or passive detection of GSM signals or GSM interference by the GSM interference detector 195.

In some embodiments, filter controller 194 may dynamically determine to selectively enable or disable GSM reject filter 162 and/or GSM reject filter 182, based on presence or non-presence of GSM interference or GSM transmissions, or based on strength or relative strength of detected GSM interference or detected GSM transmissions. In some embodiments, selective activation and/or deactivation of GSM reject filters 162 and/or 182 may be performed based on detected strength or relative strength in each independent path or branch of the DTR 191.

Upon detection of GSM interference, filter controller 194 may gradually activate the GSM reject filters 162 and 182), one after another, in a phased manner. Similarly, once the GSM interference is substantially insignificant or no longer exists, filter controller 194 may gradually deactivate the GSM reject filters 162 and 182, one after another, in a phased manner. The gradual or phased activation or deactivation of the GSM reject filters 162 and 182 may allow, for example, masking of switching effects through the MRC unit 192, thereby providing smooth continuity of digital television playback which continues to be received and processed; as well as reduction of macro blocking associated with gain and phase perturbation related to activation or deactivation of GSM reject filters 162 and/or 182 during active reception of the digital television signal.

In some embodiments, DTR 191 may commence to operate in an operational mode in which both GSM reject filters 162 and 182 are disabled, deactivated, or bypassed. If the DTR 191 determines (e.g., using the GSM interference detector 195) that a GSM transmission starts or is about to start (e.g., from the co-existing GSM transceiver 153), the filter controller 194 enables or activates the first GSM reject filter 162, in the first path 160; whereas in the second path 180, the second GSM reject filter 182 is disabled or deactivated. Then, if GSM interference still exists, and/or after a pre-defined delay period elapses, the second GSM reject filter 182 may be activated or enabled by the filter controller 194. The gradual activation or the GSM reject filters 162 and 182 may allow masking by the MRC unit 192 of possible macro blocking due to GSM reject filter activation or deactivation. In some embodiments, for example, filter controller 194 may determine which path (160 or 180) of the DTR 191 has the lowest independent Bit Error Rate (BER) value, and filter controller 194 may then firstly activate the GSM reject filter in that path (160 or 180). In some embodiments, after a first GSM reject filter (for example, GSM reject filter 162) is activated in a first path (for example, path 160), the GSM interference may still exist in the second path (namely, in path 180); however, the improved performance due to the activation of the first GSM reject filter 162 in the first path 160 may suffice to deliver an acceptable overall performance, thereby obviating the need to activate the second GSM reject filter 182 of the second path 180. Other types of gradual initial activation may be used.

In some embodiments, the GSM transceiver 153 may start a GSM transmission using high power or substantially maximal power, in order to establish a communication path, thereby creating significant GSM interference to the digital television signal. Once the GSM communication path is established, the GSM transmission power may be reduced, for example, to the minimum power level sufficient for stable GSM transmission. At this stage, the filter controller 194 may determine that at least one of the two GSM reject filters 162 and/or 182 is no longer required and may be deactivated.

The determination by filter controller 194 to selectively disable or to selectively activate one or more of the GSM reject filters 162 and 182, may be based on one or more parameters or criteria, for example, on a calculation that takes into account measurement of individual channel Bit Error Rate (BER) in each of the two paths 160 and 180. One or more BER monitoring modules or components may be used. For example, a BER monitor 165 may be associated with the first path 160, to monitor the individual BER of path 160; a BER monitor 185 may be associated with the second path 180, to monitor the individual BER of path 180; and/or a BER monitor 196 may be associated with the MRC unit 192 or with the MRC output, to monitor the BER of the MRC output. Information from the BER monitors 165, 185 and/or 196 may be used by the filter controller 194 to determine whether or not to selectively activate (or whether or not to selectively deactivate) one or more of the GSM reject filters 162 and/or 182.

In some embodiments, for example, if the BER value of the first path 160 is greater than a pre-defined threshold value, and also the BER value of the second path 180 is greater than the pre-defined threshold value, then the filter controller 194 may determine to deactivate one of the GSM reject filters 162 or 182. In some embodiments, if the BER value of the output of the MRC unit 192 is greater than a pre-defined threshold value, then the filter controller 194 may determine to deactivate one of the GSM reject filters 162 or 182.

In some embodiments, for example, filter controller 194 may determine to deactivate the GSM reject filter (162 or 182) of the path (160 or 180) having the greater BER value, or of the path having the greatest BER value (e.g., if more then two paths are used by DTR 191). In some embodiments, the filter controller 194 may determine to deactivate the GSM reject filter (162 or 182) of the path (160 or 180) having the smaller BER value, or of the path having the smallest BER value (e.g., if more then two paths are used by DTR 191). In some embodiments, for example, the filter controller 194 may determine to activate the GSM reject filter (162 or 182) of the path (160 or 180) having the greater BER value, or of the path having the greatest BER value (e.g., if more then two paths are used by DTR 191). In some embodiments, the filter controller 194 may determine to activate the GSM reject filter (162 or 182) of the path (160 or 180) having the smaller BER value, or of the path having the smallest BER value (e.g., if more then two paths are used by DTR 191). The threshold value may be pre-set or pre-defined, or may be dynamically calculated or modified or adapted, in order to allow an acceptable BER of the MRC output, or in order to allow a pre-defined level of Quality of Service (QoS) of the MRC output.

In some embodiments, BER values may be monitored substantially continuously, or at pre-defined time intervals. BER values may be monitored prior to, and/or subsequent to, activation or deactivation of GSM reject filters 162 and/or 182. Based on a change in BER value(s) due to activation or deactivation of GSM reject filters 162 and/or 182, filter controller 194 may determine whether or not to re-activate GSM reject filter 162 that was deactivated; whether or not to deactivate GSM reject filter 162 that was activated; whether or not to maintain the operational status of GSM reject filter 162 and/or GSM reject filter 182; whether or not to further deactivate GSM reject filter 182 after deactivation of GSM reject filter 162; whether or not to further activate GSM reject filter 182 after activation of GSM reject filter 162; etc.

Although portions of the discussion herein relate, for demonstrative purposes, to monitoring of BER values, and to selective activation or deactivation of GSM rejecter filter(s) based on BER values, some embodiments of the invention may include monitoring of other values or parameters (e.g., instead of or in addition to BER values), and/or selective activation or deactivation of GSM rejecter filter(s) based on other values or parameters (e.g., instead of or in addition to BER values); such parameters may include, for example, symbol error rate, or other suitable signal performance parameters.

In some embodiments, the filter controller 194 may take into account additional and/or other information, for example, information from the GSM interference detector 195; as well as information from the OS 137 or from applications 138 or from the GSM transceiver 153 (or from a software driver or application thereof) regarding beginning of GSM transmissions, regarding completion of GSM transmissions, and/or regarding GSM transmission power. The activation and/or deactivation of GSM reject filters 162 and/or 182 is masked by the MRC unit 192; and the operation of the GSM reject filters 162 and/or 182 is dynamically improved or optimized based on signal conditions. Some embodiments thus utilize information internal and/or external to station 100 in order maximize the power operating envelope of the digital television signal using a predictive or adaptive algorithm, and in order to maximize the sensitivity of the DTR 191 in the presence (or possible presence) of GSM interference.

In some embodiments, DTR 191 may mitigate GSM interference created by a GSM source external to station 100, for example, by GSM transceiver 173 of AP 110; or by other GSM interference sources to which the DTR 191 may not have privilege to access, or to determine whether a GSM transmission occurs or is about to commence. In such cases, DTR 191 may be configured or pre-configured to have GSM reject filter 162 activated and GSM reject filter 182 deactivated (or vice versa), to allow GSM interference rejection while maintaining sensitivity of the DTR 191 to digital television signals. Then, based on the relative BER of each of the two paths 160 and 180, the GSM reject filter 162 (or 182) may be dynamically deactivated, and/or the GSM reject filter 182 (or 162) may be dynamically activated, if needed.

For example, in some embodiments, if the BER value of the MRC unit 192 output is greater than a threshold value, and an increase in BER is detected for each of the two paths 160 and 180 (e.g., of a "burst" pattern and possibly related to local GSM transmissions by GSM transceiver 153), then the filter controller 194 may selectively activate the GSM reject filter (162 or 182) in the path (160 or 180) having greater sensitivity.

In some embodiments, the determination to selectively activate or deactivate one or more of the GSM reject filters 162 and/or 182 may take into account information about the frequency of the received digital television signal. For example, a larger frequency offset from the GSM transmission frequency (e.g., an offset greater than a threshold value) may indicate a greater immunity of the DTR 191 to interfering GSM transmissions, thereby allowing de-activation of at least one of the GSM reject filters 162 and 182.

In some embodiments, GSM reject filters 162 and/or 182 may be selectively activated and/or deactivated substantially without introducing any additional insertion loss. This may be performed, for example, by adding one or more switches or switching components (e.g., Field-Effect Transistors (FETs), or utilizing RF relay, switched output on an amplifier, switched input on an amplifier, or the like) in suitable locations, e.g., at the entry and/or exit of GSM reject filter 162 and/or 182, optionally with provisioning by providing appropriate RF inputs.

Some embodiments thus provide an improved protection of the digital television signal and the DTR 191 from GSM transmissions and GSM interference, created by local (co-existing) or remote GSM transmitters; without degrading the sensitivity of the DTR 191, without generating picture artifacts, and together with increased digital signal reception coverage.

In some embodiments, DTR 191 and the algorithm applied by the filter controller 194 are able to mitigate interference to digital television signals received (or intended for reception) by DTR 191; to mitigate interference generated by the IEEE 802.11 transceiver 151 of station 130; to mitigate interference generated by the IEEE 802.16 transceiver 152 of station 130; to mitigate interference generated by the GSM transceiver 153 of station 130; to mitigate interference generated by the remote IEEE 802.11 transceiver 171 of AP 110; to mitigate interference generated by the remote IEEE 802.16 transceiver 172 of AP 110; and/or to mitigate interference generated by the remote GSM transceiver 173 of AP 110.

Although portions of the discussion herein relate, for demonstrative purposes, to DTR 191 having two paths 160 and 180, the DTR 191 may include other number of paths, and more than two diversity receivers may be deployed, for example, to further enhance the performance. The components and/or functionality of such additional path(s) may be substantially similar to those of path 162 or 182. Accordingly, the MRC unit 192 receives input from more than two diversity receivers; the filter controller 194 analyzes the BER values of the more than two paths; and the filter controller 194 is able to selectively activate and/or deactivate GSM reject filter(s) of the additional paths.

Figure 2:
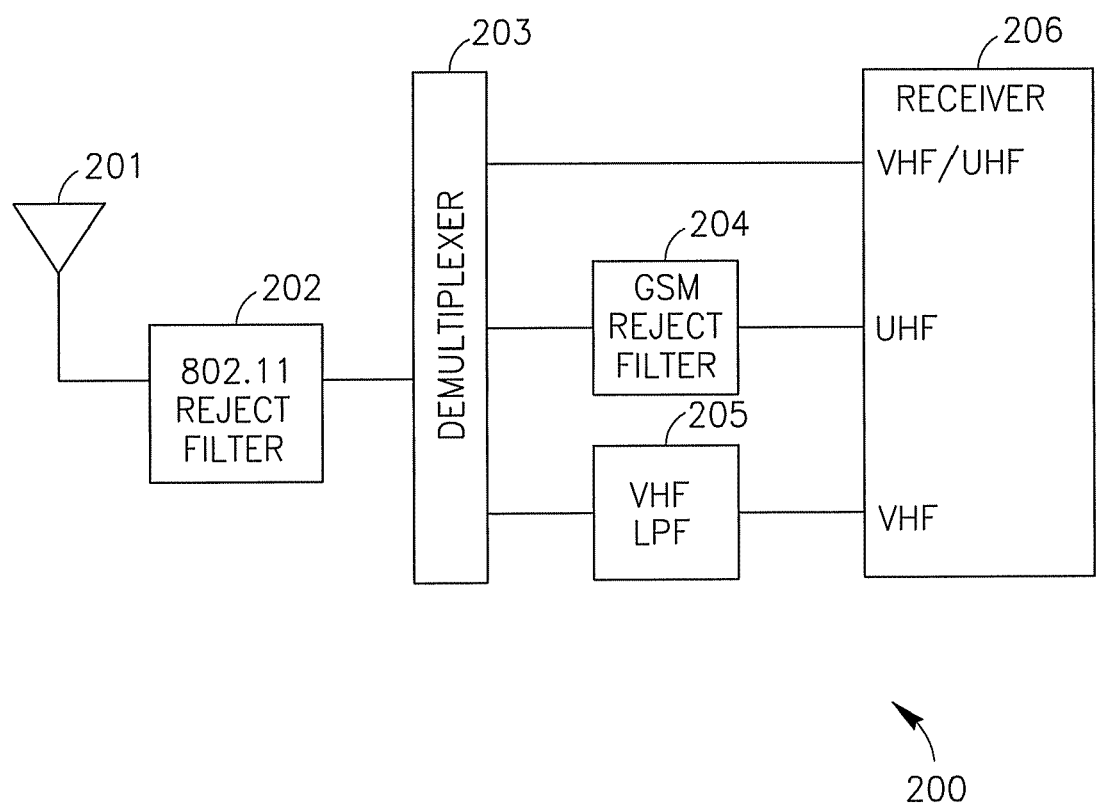
FIG. 2 is a schematic block diagram illustration of a portion of a channel path of a diversity-based digital television receiver in accordance with a demonstrative embodiment of the invention.

FIG. 2 schematically illustrates a block diagram of a portion of a channel path 200 of a diversity-based DTR in accordance with some demonstrative embodiments of the invention. Channel path 200 may be a demonstrative example of path 160 or 180 of FIG. 1.

Channel path 200 includes, for example, an antenna 201; a filter to reject non-GSM transmissions or interference, for example, an IEEE 802.11 reject filter 202; and a demultiplexer 203. The demultiplexer 203 may provide Very High Frequency (VHF) signals and Ultra High Frequency (UHF) signals to a receiver 206. For example, the demultiplexer 203 provides a VHF signal to the receiver 206 through a VHF Low-Pass Filter (LPF); the demultiplexer 203 further provides in parallel a UHF signal to the receiver 206 through a GSM reject filter 204; and additionally, the demultiplexer 203 further provides in parallel a VHF/UHF signal directly to the receiver 206 without intermediate filter(s). This front-end filtering arrangement provides to the receiver 206 a suitable transfer characteristic, by filtering-in the wanted signals and by filtering-out unwanted signals; thereby increasing bypass of the GSM reject filter 204 by wanted signals.

Figure 3:
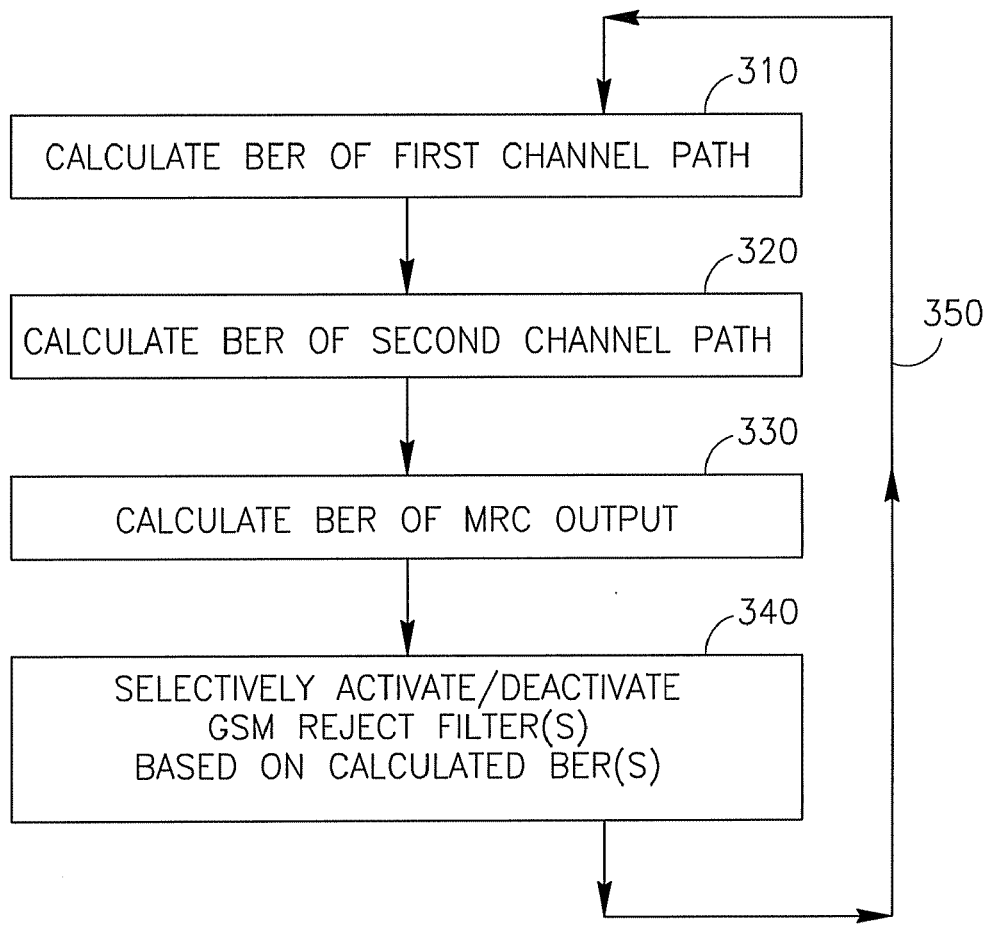
FIG. 3 is a schematic flow-chart of a method of mitigating interference to digital television signals in accordance with a demonstrative embodiment of the invention.

FIG. 3 is a schematic flow-chart of a method of mitigating interference to digital television signals in accordance with some demonstrative embodiments of the invention. Operations of the method may be used, for example, by system 100 of FIG. 1, by DTR 191 of FIG. 1, by filter controller 194 of FIG. 1, and/or by other suitable units, devices and/or systems.

In some embodiments, the method may include, for example, calculating a BER value for a first channel path of a diversity-based DTR (block 310).

In some embodiments, the method may include, for example, calculating a BER value for a second channel path of the diversity-based DTR (block 320).

In some embodiments, the method may include, for example, calculating a BER value for an output of a MRC unit of the diversity-based DTR (block 330).

In some embodiments, the method may include, for example, selectively activating and/or deactivating (or switching an operation state of) at least one of multiple GSM reject filters of the diversity-based DTR, based on at least one of the calculated BER values (block 340).

In some embodiments, the method may include, for example, repeating the operations of block 310 and onward (arrow 350).

Other suitable operations may be used, and other suitable orders of operation may be used. One or more operations may be repeated, for example, for a pre-defined time period, for a pre-defined number of iterations, substantially continuously, at pre-defined time intervals, until a pre-defined condition holds true, or based on other criteria.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a diversity-based digital television receiver comprising a filter controller, a Maximum-Ratio Combining unit and at least first and second channel paths, wherein the first channel path comprises a first Global System for Mobile communication (GSM) reject filter, the second channel path comprises a second GSM reject filter, the second channel path is parallel to the first channel path, the Maximum-Ratio Combining unit is to combine a signal from the first channel path with a signal from the second channel path, the filter controller is to selectively switch an operational state of at least one of the first and second GSM reject filters upon detection of GSM interference, and wherein subsequent to selective activation of the first GSM reject filter, if a Bit Error Rate value of an output of the Maximum-Ratio Combining unit is greater than a threshold value, the filter controller is to activate the second GSM reject filter.

2. The apparatus of claim 1, wherein the filter controller is to selectively switch an operational state of at least one of the first and second GSM reject filters based on Bit Error Rate values of the first and second channel paths.

3. The apparatus of claim 1, wherein the filter controller is to selectively activate the first GSM reject filter and to maintain the second GSM reject filter deactivated if a Bit Error Rate value of the first channel path is greater than a Bit Error Rate value of the second channel path.

4. The apparatus of claim 1, wherein the filter controller is to selectively switch an operational state of at least one of the first and second GSM reject filters based on a signal indicating commencement of a GSM transmission, wherein the signal comprises at least one signal selected from the group consisting of: a signal received from a GSM transmitter of the apparatus, and a signal received from a GSM interference detector.

5. The apparatus of claim 1, wherein the filter controller is to selectively switch an operational state of at least one of the first and second GSM reject filters based on a signal indicating termination of a GSM transmission, wherein the signal comprises at least one signal selected from the group consisting of: a signal received from a GSM transmitter of the apparatus, and a signal received from a GSM interference detector.

6. The apparatus of claim 1, wherein the first channel path comprises one or more switching components substantially at an entry of the first GSM filter, and one or more switching components substantially at an exit of the first GSM filter.

7. The apparatus of claim 1, wherein the filter controller is to selectively deactivate at least one of the first and second GSM reject filters if a frequency offset of an incoming digital television signal from a GSM transmission frequency is greater than a threshold value.

8. The apparatus of claim 1, wherein the first channel path comprises:
a demultiplexer to demultiplex an incoming digital television signal, to provide a Very High Frequency (VHF) signal to a receiver through a Low Pass Filter, to provide in parallel an Ultra High Frequency (UFH) signal to the receiver through the first GSM reject filter, and to provide in parallel to the receiver a non-filtered VHF/UHF signal.

9. The apparatus of claim 1, wherein the apparatus comprises a device selected from a group consisting of: a Personal Computer, a laptop computer, a portable computer, a television, and a television set-top box.

10. A method comprising:
selectively switching an operational state of at least one of a plurality of Global System for Mobile communication (GSM) reject filters of a diversity-based digital television receiver, based on at least one value selected from the group consisting of:
a Bit Error Rate value of a first channel path of the diversity-based digital television receiver,
a Bit Error Rate value of a second channel path of the diversity-based digital television receiver, and
a Bit Error Rate value of an output of a Maximum-Ratio Combining unit of the diversity-based digital television receiver,
wherein selectively switching the operational state of at least one of the plurality of GSM reject filters comprises selectively activating a first GSM reject filter of the plurality of GSM reject filters, and subsequently to activating the first GSM reject filter, activating a second GSM reject filter of the plurality of GSM reject filters if the Bit Error Rate value of the output of the Maximum-Ratio Combining unit is greater than a threshold value.

11. The method of claim 10, comprising:
selectively switching an operational state of at least one of the GSM reject filters based on a signal indicating commencement of GSM transmission by a co-located GSM transmitter.

12. The method of claim 10, comprising:
selectively switching an operational state of at least one of the GSM reject filters based on a signal indicating detection of GSM interference.

* * * * *

UNITED STATES PATENT AND TRADEMARK OFFICE
CERTIFICATE OF CORRECTION

| | | |
|---|---|---|
| PATENT NO. | : 8,351,862 B2 | Page 1 of 1 |
| APPLICATION NO. | : 11/968168 | |
| DATED | : January 8, 2013 | |
| INVENTOR(S) | : Ernest T. Tsui et al. | |

It is certified that error appears in the above-identified patent and that said Letters Patent is hereby corrected as shown below:

In column 12, line 25, in claim 8, delete "(UFH)" and insert -- (UHF) --, therefor.

Signed and Sealed this
Second Day of April, 2013

Teresa Stanek Rea
*Acting Director of the United States Patent and Trademark Office*